UNITED STATES PATENT OFFICE.

MARC DARRIN, OF WILKINSBURG, PENNSYLVANIA, ASSIGNOR TO H. KOPPERS COMPANY, OF PITTSBURGH, PENNSYLVANIA, A CORPORATION OF PENNSYLVANIA.

PAINT OR VARNISH AND PAINT OR VARNISH INGREDIENT.

1,296,776.  Specification of Letters Patent.  Patented Mar. 11, 1919.

No Drawing.  Application filed June 29, 1918. Serial No. 242,637.

*To all whom it may concern:*

Be it known that I, MARC DARRIN, a resident of Wilkinsburg, in the county of Allegheny and State of Pennsylvania, have invented a new and useful Paint or Varnish and Paint or Varnish Ingredient, of which the following is a full, clear, and exact description.

My invention relates to the production of a superior paint or varnish solvent, or ingredient, from crude solvent naphtha, such, for instance, as results from the recovery of benzol from gas or tar.

I have discovered that the solvent produced by heating crude solvent naphtha under pressure within an autoclave and subjecting the product to distillation as described in United States Patent No. 1,263,813, for manufacture of resins, is very much superior for paint or varnish-making purposes, and that a very superior weather and chemical-resisting, homogeneous, non-settling paint can be produced when properly incorporated with a bituminous pitch. Not only am I able to produce an excellent paint from the distillate resulting from the above mentioned process for manufacture of resins, but I have also been able to incorporate the undistilled material directly as obtained from the autoclave used in such process, providing a proper grade of crude solvent naphtha is initially treated, that is, practically free from naphthalene, heavy paraffins, etc.

The method which I have found best adapted to making this coating material consists in heating a quantity of bituminous pitch to approximately 200° C., at which temperature it is very fluid, allowing the pitch to cool to a temperature of about 150° C. or thereabouts, and then adding the treated solvent, either hot or cold, and in which there is in solution certain coumarone-indene compounds which were not completely polymerized by the autoclave treatment. It is offered as an explanation as to the cause of the exceptional quality of the paint thus produced that the autoclave treatment removes certain bodies which may have an injurious effect on the paint, that is, dicyclopentadiene, styrolene, etc.

As a specific example, I obtain an excellent paint by use of the following proportions:

800 lbs. of hard coal tar pitch,
70 gals. of the treated solvent naphtha.

If, in the process as above described, a low boiling solvent containing appreciable quantities of toluol and benzol is employed, it is advisable to cut out the fraction boiling below 135° C., as this material is less suitable for paint manufacture. If, on the other hand, a high boiling solvent is encountered, say one containing a considerable proportion of naphthalene and high boiling oils, the fraction above 200° C. should be cut out as undesirable for paint manufacture. The most desirable fraction for paint manufacture boils between 135° C. and 200° C. Other materials, such as turpentine, linseed oil, China wood oil, Venetian red, red lead, zinc oleate, manganese resinate, barium sulfate, etc., may be mixed with the herein described composition for use as thinners, driers, fillers, etc., without affecting the intent and purpose of this invention.

Furthermore, the product directly obtained from the autoclave can also be advantageously employed as an ingredient in the ordinary manufacture of varnishes, paints, lacquers, and the like, replacing either partially or wholly, rosin, fossil resins, or vegetable oils, since this material appears to partake both of the nature of a drying oil and a resinous bonding agent. A coating material thus made is particularly resistant to the action of water, acids, alkalis, corroding gases and the like.

In the above described invention, particular reference is made to the use of crude solvent naphtha resulting from gas-scrubbing operations, particularly coke oven gas and gas obtained from any form of coal distillation in horizontal or vertical retorts or otherwise. The invention also has particular reference to crude solvent naphtha obtained from the scrubbing of water gas and oil gas or other oil-bearing gases or air. However, this invention does not limit itself to crude solvent naphtha obtained from the above sources, but is intended to cover any source of crude solvent naphtha or other liquids containing coumarone-indene bodies or other bodies capable of polymerization.

In the above description, I did not limit myself to the particular proportions of ingredients, etc., or to the particular temperatures, as above stated, as these may be varied to a considerable extent within the scope of the appended claims.

I claim:

1. A paint or varnish containing in admixture crude solvent naphtha which has been subjected to a polymerization process.

2. A paint or varnish containing in admixture crude solvent naphtha which has been subjected to an autoclave treatment.

3. A paint or varnish containing in admixture crude solvent naphtha which has been subjected to a polymerization process and to a distillation process.

4. A paint or varnish containing in admixture crude solvent naphtha which has been subjected to an autoclave treatment and to a distillation process.

5. A paint or varnish containing in admixture partially polymerized crude naphtha.

6. A paint or varnish containing in admixture a distillate resulting from a crude solvent naphtha polymerization process.

7. A paint or varnish containing in admixture a distillate resulting from a crude solvent naphtha heat polymerization process.

8. A paint or varnish containing in admixture a distillate from an autoclave process for treating crude solvent naphtha.

9. A paint or varnish containing in admixture the material produced by subjecting crude solvent naphtha to heat and pressure with a subsequent separation by distillation of the solvent from the heavy residue.

10. A paint or varnish comprising a bituminous pitch and crude solvent naphtha which has been subjected to an autoclave treatment.

11. A paint or varnish comprising a bituminous pitch and crude solvent naphtha which has been subjected to an autoclave treatment and to a distillation process.

12. A paint or varnish comprising a coal tar pitch and crude solvent naphtha which has been subjected to an autoclave treatment.

13. A paint or varnish comprising a coal tar pitch and crude solvent naphtha which has been subjected to an autoclave treatment and to a distillation process.

In testimony whereof I have hereunto set my hand.

MARC DARRIN.